(No Model.)
J. S. DAVIS.
HAND PLANTER.
No. 431,841. Patented July 8, 1890.
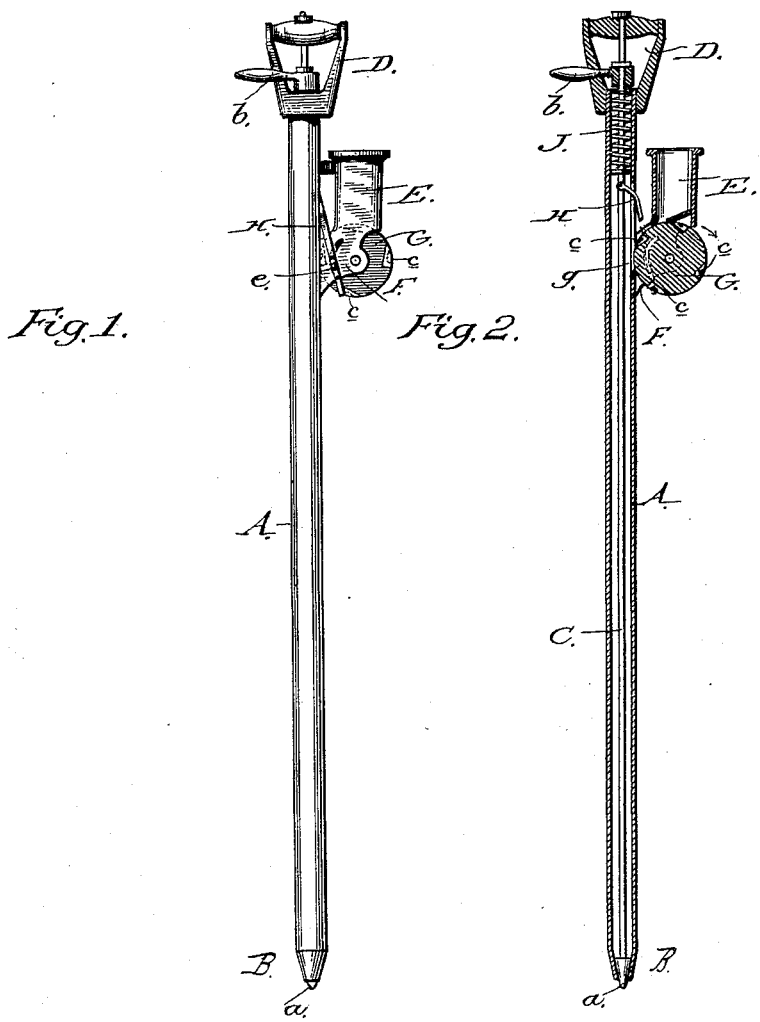
WITNESSES
T. W. Fowler,
W. H. Patterson
INVENTOR
John S. Davis,
by A. H. Evans & Co
Attorneys

UNITED STATES PATENT OFFICE.

JOHN S. DAVIS, OF MONTGOMERY, ALABAMA, ASSIGNOR OF ONE-HALF TO DANIEL S. TROY, OF SAME PLACE.

HAND-PLANTER.

SPECIFICATION forming part of Letters Patent No. 431,841, dated July 8, 1890.

Application filed February 21, 1890. Serial No. 341,284. (No model.)

*To all whom it may concern:*

Be it known that I, JOHN S. DAVIS, a citizen of the United States, residing at Montgomery, in the county of Montgomery and State of Alabama, have invented certain new and useful Improvements in Hand-Planters, of which the following is a full and clear description, reference being had to the accompanying drawings, forming part of this specification, in which—

Figure 1 is a side elevation of a hand-planter embodying my invention. Fig. 2 is a sectional view of the same.

My invention relates to that class of hand-planters in which the planting-tube is pushed into the ground, making the hole in which the seed is deposited; and my invention consists in a new and improved planting-tube which may be used as a part of a hand-planter or in seeders and planters operated by animal or other power, and in the construction and combination of devices for using this planting-tube in hand-planters, and also in seeders and planters operated by animal or other power, and particularly the improved seeder and planter for which Letters Patent were issued to John S. Davis and Daniel S. Troy, assignee, No. 413,613, dated October 22, 1889, which planting-tube, and also the construction and combination of devices for its use in a hand-planter or like device, I shall hereinafter fully describe and claim.

Referring to the drawings for a more clear description of my invention, A is a planting-tube, having its lower end B made conical and designed to penetrate the ground. The tube A is provided with the plunger C, the lower end $a$ of which is also made conical and serves as a valve, which, when projected, closes the outlet at the end of the tube. The rod or plunger C is round or conical at the lower end, so as to close the outlet in the tube; but above this the plunger may be flat or flanged, leaving sufficient space between it and the sides of the tubes for passage of the seed. The tube A is provided with a handle D at its upper end, by which it is pushed into the ground, and the plunger C is provided with a lug $b$, convenient to the handle of the tube, by which the plunger can be raised. A seed-hopper E is attached to the tube below the handle and is provided with a discharge-opening, the said hopper being held by the supports F, attached to the tube below the seed-hopper. Between the supports is mounted the disk G, the periphery of which is provided with seed-pockets $c$ to receive the seed passing from the outlet in the bottom of the seed-hopper. This disk is connected with the plunger by the connecting-rod H, whose lower end is fitted to a pin $e$ on the disk and working in a curved slot in one of the supports $s$. A spring J is fitted around the stem of the plunger and serves to project it downward, and the disk is so adjusted that when the rod is in this position no seed-pocket in the disk is in alignment with the bottom opening of the hopper; but by lifting the plunger the disk is rotated by the connecting-rod H to bring one of the seed-pockets in said disk beneath the outlet in the bottom of the hopper. When the plunger is projected by its spring J, the disk returns to its former position, and this causes the seed to drop into the tube through hole $g$, provided for that purpose. The disk has in its periphery several seed-pockets of different sizes, any one of which may be used by so changing the point of attachment of the connecting-rod H as to bring the desired seed-pocket into position.

The mode of operation of the parts just mentioned is to place seed in the hopper E, and then seizing the apparatus by the handle D lift the plunger by the lug $b$ and release it. The lifting of the plunger causes the disk to revolve sufficiently to bring the seed-pocket beneath the hopper and it is filled with seed. When the plunger is released, the disk G revolves back and the seed drops from the pocket through the hole $g$ into the tube. The planting-tube being now ready for planting, the end is then pushed into the ground the desired depth, and the plunger is again raised and released, as previously described, to permit the seed in the planting-tube to fall out through the outlet at the same time the disk is moved, so as to again fill the pocket and drop the seed into the planting-tube ready for the next planting. Thus by pushing the tube with the hand into the ground and lifting the plunger with the fingers, and then releasing it before withdrawing the tube from the ground, the contents of the seed-pocket are certainly and securely placed at the bottom of each hole in the ground made by the tube and the tube is charged for the next planting.

The mode of operating the tube either by hand or by machinery is to enable the spring to press out the plunger so as to close the outlet at the end of the planting-tube; and then, having placed in the tube the seed required for a hole, to push the outer end of the planting-tube into the ground to the depth required for planting. The plunger is then raised, opening the outlet at the lower end of the tube and permitting the seed, which has been previously deposited therein, to fall out through the outlet at the end of the tube to the bottom of the hole in the ground. The seed having thus passed out of the tube into the hole in the ground, the plunger is again pressed out to close the outlet and prevent earth from entering the tube. The planting-tube is then lifted out of the ground and the operation repeated. The entire operation of pressing out the plunger, placing seed in the planting-tube, pushing the planting-tube in the ground, raising the plunger so as to permit the seed to fall through the outlet to the bottom of the hole in the ground, again pressing out the plunger to close the outlet in the tube, and finally lifting the planting-tube from the ground may be done entirely by hand, or partly by hand and partly by machinery, or entirely by machinery, without departing from the spirit of my invention.

Having thus described my invention, what I claim as new, and desire to secure by Letters Patent, is—

1. The planting-tube having its lower end made conical and adapted to be forced into the ground and means for directing seed thereto, in combination with a spring-actuated plunger operating within said tube, and having a conical end adapted to close the discharge end of the tube, and a lug on the upper end of the plunger, by which the latter may be raised sufficiently to open the discharge end of the planting-tube and permit the seed therein to drop out, substantially as herein described.

2. The planting-tube having a conical lower end and a handle at its upper end, a spring-actuated plunger within said tube, having a conical end adapted to close the conical end of the planting-tube and provided with a lug by means of which the plunger is raised, in combination with a seed-hopper supported on the upper end and outside of the planting-tube, a disk journaled below and within the lower end of said hopper and having seed-pockets in its periphery, and a connection between the disk and the plunger, whereby the disk is operated by the movement of said plunger, substantially as herein described.

3. The combination of the planting-tube having an opening in its side and a conical lower end adapted to be thrust into the ground, a spring-actuated plunger within said planting-tube, a hopper supported exteriorly upon the upper end of the tube, a disk outside of the tube and operating within the lower discharge end of the hopper, having pockets of varying capacity in its periphery, and a rod connected to the plunger and adjustably secured to the disk, whereby any of the said pockets may be brought into alignment with the discharge end of the hopper and the seed received by the pockets discharged into the open side of the hopper, substantially as herein described.

JOHN S. DAVIS.

Witnesses:
W. D. PECK,
ROBT. GOLDTHWAITE.